United States Patent [19]
Caldwell

[11] 3,986,581
[45] Oct. 19, 1976

[54] DAMPING UNIT FOR GLOBULAR STORAGE TANK
[75] Inventor: Donald B. Caldwell, Lake Elmo, Minn.
[73] Assignee: Minnesota Mining and Manufacturing Company, St. Paul, Minn.
[22] Filed: Feb. 17, 1976
[21] Appl. No.: 658,223

[52] U.S. Cl. .............................. 188/1 B; 52/173 R; 248/358 R
[51] Int. Cl.² .......................................... F16D 63/00
[58] Field of Search .................... 188/1 B, 1 R, 268; 52/173; 248/358 R, 15, 18

[56] References Cited
UNITED STATES PATENTS

| | | | |
|---|---|---|---|
| 3,520,096 | 7/1970 | Kilcher | 188/1 B |
| 3,565,386 | 2/1971 | Lemkull | 248/358 R |
| 3,605,953 | 9/1971 | Caldwell et al. | 188/1 B |
| 3,826,339 | 7/1974 | Brokaw | 188/1 B |

Primary Examiner—Trygve M. Blix
Assistant Examiner—Douglas C. Butler
Attorney, Agent, or Firm—Alexander, Sell, Steldt & DeLaHunt

[57] ABSTRACT

Doughnut-shaped damping unit comprising a pair of ring-shaped rigid members adhered to either side of a ring-shaped viscoelastic layer. One of the rigid members is adapted to be fixed to the lowermost portion of a spherical storage tank and the other is adapted to be anchored to the earth. When an earth tremor produces lateral movement of the tank, the viscoelastic layer provides damping, tending to prevent the tank from breaking away from its framework.

8 Claims, 6 Drawing Figures

DAMPING UNIT FOR GLOBULAR STORAGE TANK

BACKGROUND OF THE INVENTION

Safe storage of petroleum products and drinking water in areas subject to earthquake has long been a subject of intensive study and experimentation. The most common devices for safeguarding the storage tanks are hydraulic dampers which are located between points of the supporting framework that are subject to relative movement. Such hydraulic devices are exceedingly complex and expensive, require continuous maintenance, and have limited effectiveness.

U.S. Pat. No. 3,605,953, of which the present inventor is one of four inventors, discloses a damping unit for a building or structure which is subject to subsonic oscillations such as may be produced by the wind or by earth movements. That damping unit comprises at least two rigid members and a layer of viscoelastic material bonded between broad surfaces of each pair of rigid members. By attaching such a damping unit between two points of the structure which experience relative motion when it oscillates due to wind or earth movement, the oscillation produces shear displacement in the viscoelastic layer which absorbs energy by virtue of its "lossy" nature. For effective damping, the viscoelastic material should have a loss tangent of at least 0.5 measured at the operating temperature of the damping unit and at the frequency of oscillation to be damped. A high building may oscillate in the wind at a frequency approximately 0.1 cycle per second whereas the frequency of an earthquake may be from 0.5 to 10 cycles per second.

THE PRESENT INVENTION

The present invention concerns a damping unit of the type disclosed in U.S. Pat. No. 3,605,953 which is specifically designed to safeguard a storage tank against the catastrophy that would result from its rupture in an earthquake. The novel damping unit, which is useful for a storage tank that rests on a peripheral framework, comprises at least two rigid members having essentially annular broad surfaces. One rigid member is adapted to be fixed to the nadir of the tank while the other is anchored to the earth. A layer of viscoelastic material bonded to said broad surfaces has essentially the same properties as does the viscoelastic material of the damping unit of U.S. Pat. No. 3,605,953 such as good age resistance, except that its properties are preferably measured at the average operating temperature at a frequency of about five cycles per second. Such properties include a loss tangent of at least 0.5,
an ultimate shear strength of at least 1.5 N/m$^2$,
an elongation in tension of at least 100%, and
a shear strain value of at least one.

Since the average operating temperature will normally be close to ordinary room temperature, these properties may be measured at 23° C. As in the damping unit of U.S. Pat. No. 3,605,953, each rigid member should have a stiffness exceeding that of 0.25-cm steel plate, preferably at least equal to that of 0.5-cm steel plate. The bond between each rigid member and the viscoelastic layer should not fail when the shear strain in the viscoelastic layer is one.

The upper of the rigid members of the novel damping unit conveniently extends upwardly at its periphery sufficiently above its central portions to permit it to be fixed directly to the shell of a globular tank. Alternatively, the tank may be fitted with a dependent collar which fastens to the periphery of the upper of the rigid members. The lower of the rigid members is conveniently anchored to the earth by being fixed to a massive concrete footing. The novel dampint unit may have a central opening to accommodate an intake and/or outlet for the tank.

Upon any movement in the earth, the globular tank and upper rigid member of the novel damping unit tend to move laterally with respect to the lower rigid member, applying a shear force to the viscoelastic layer. By virtue of its high loss tangent and other properties enumerated above, the viscoelastic material absorbs lateral energy of the tank and thus tends to prevent the tank from breaking away from its supporting framework. However, the massive nature of the tank and its contents requires the viscoelastic layer to be quite large, generally much larger than in the individual damping units described in U.S. Pat. No. 3,605,953. In any event, the viscoelastic layer should have a thickness of at least one centimeter, and its area should be at least 1000 square centimeters, more typically 5000 cm$^2$ or more. For a specific installation, its area should be at least 0.01 m$^2$ per Newton of force against which the storage tank should be protected. Generally, the thickness of the viscoelastic layer should be in the range of 5 to 25 cm, because the tank tends to move downwardly when it moves laterally and the two rigid members of the damping unit should never contact each other.

For convenience of manufacture, the viscoelastic layer is preferably of uniform thickness. However, by forming one or both of the rigid members of the damping unit to have essentially conical or frustro-conical surfaces to which the viscoelastic layer is bonded, the thickness of the viscoelastic layer may increase toward its periphery.

Figure 1:
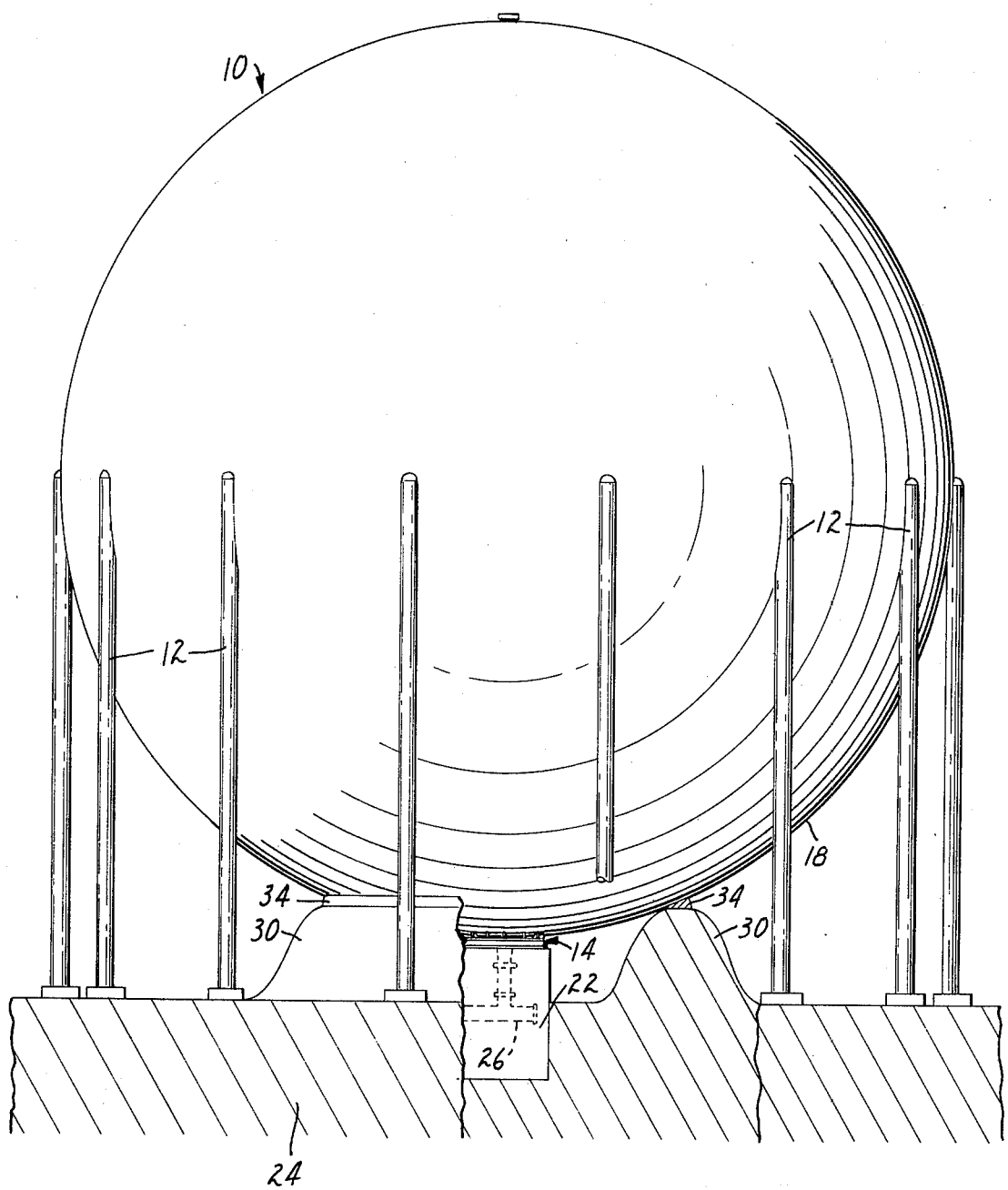
FIG. 1 is a schematic elevation, broken away in part, of a spherical storage tank equipped with a damping unit of the present invention.
Figure 2:
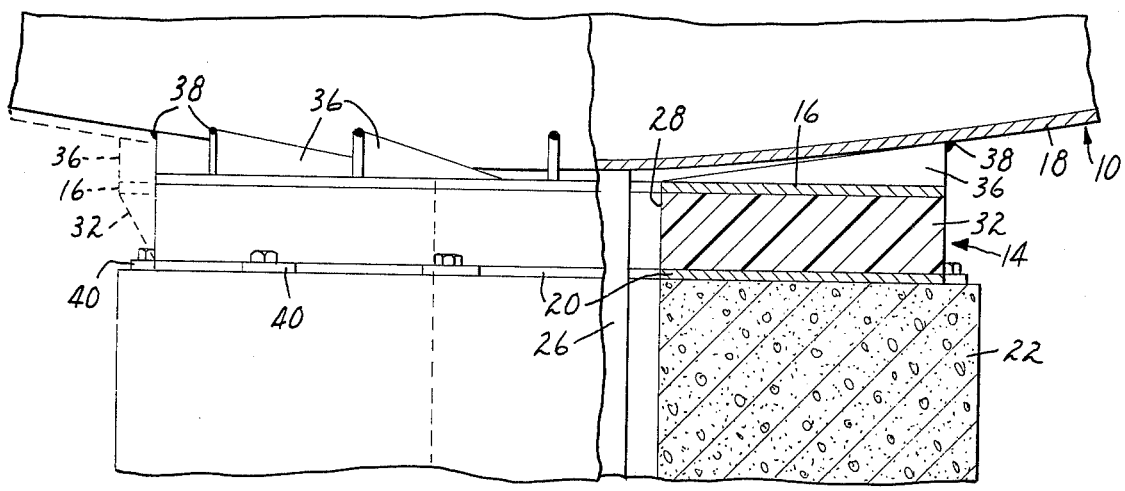
FIG. 2 is a fragmentary enlargement of the elevation of FIG. 1 at the damping unit, broken away in part to a central section.
Figure 3:
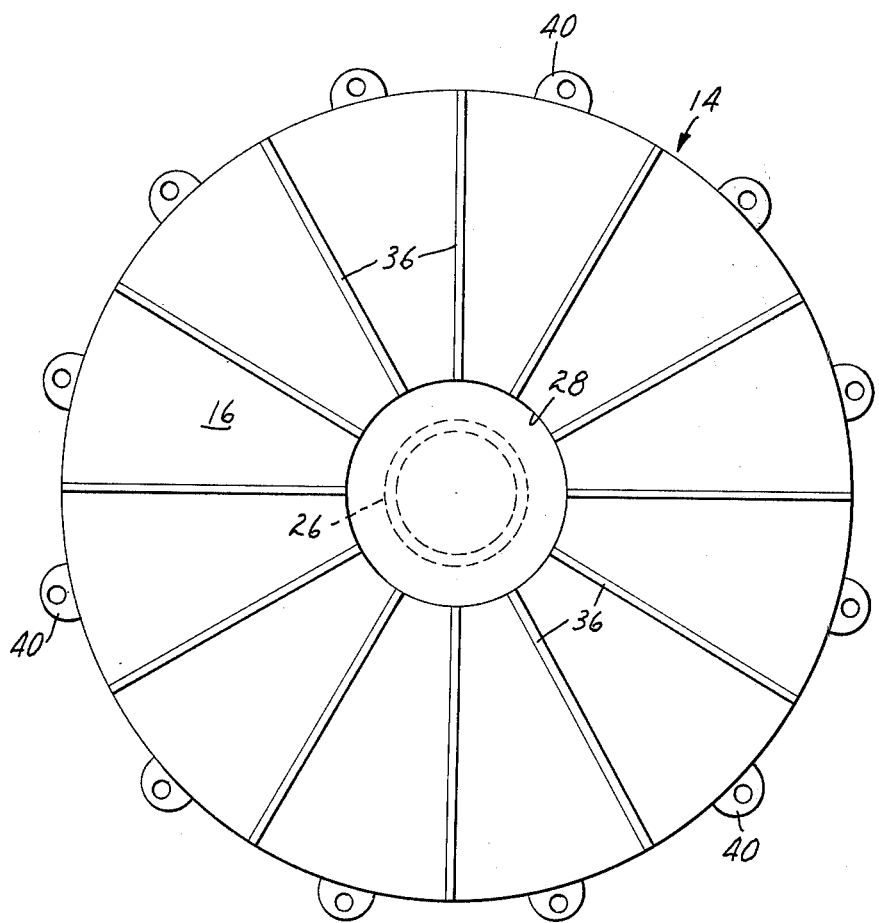
FIG. 3 is a plan view of the damping unit of FIGS. 1 and 2.

The spherical storage tank 10 of FIGS. 1–3 is supported by a peripheral framework comprising fourteen columns 12 which are interlaced by a reinforcing network (not shown). The damping unit 14 has an upper rigid member 16 fixed to the lowermost portion of the shell 18 of the tank 10 and a lower rigid member 20 anchored to a massive concrete footing 22 in the earth 24. An outlet pipe 26 passes through a central opening 28 in the damping unit 14. An annular earth berm 30 (FIG. 1) seals the damping unit 14 from the elements so that the temperature of its viscoelastic layer 32 remains close to the essentially constant temperature of the earth, and hence its damping properties also remain essentially constant. An insulating collar 34 helps to make the earth seal effective.

Although not shown because electric circuits are generally prohibited close to tanks for storing inflammable materials, an electric heating coil and thermostat may be embedded in the viscoelastic layer to keep it at a constant temperature at least equal to the highest temperature to which it would otherwise be exposed during use.

As can best be seen in FIGS. 2 and 3, the upper rigid member 16 comprises a flat annular plate having a plurality of upstanding, radially extending gussets 36 which reach a maximum height at the periphery of the upper rigid member 16. Welds 38 at such points of maximum height fix the upper rigid member 16 to the shell 18 of the tank 10. The lower rigid member 20 is bolted to the concrete footing 22 at projections 40 along its periphery.

Upon lateral and downward movement of the shell 18 of the storage tank as shown by dotted lines in FIG. 2, the viscoelastic layer 32 tends to absorb the shearing force by virtue of its high loss factor and to develop a force tending to return the shell to its original position. By selecting the viscoelastic layer 32 to have a shear strain value of at least one, the shell can move at least to the position shown by the dotted lines without failure. Viscoelastic materials are readily available which have shear strain values far in excess of one so that considerable lateral movement can be tolerated if the viscoelastic layer has a preferred thickness of at least five centimeters.

Figure 4:
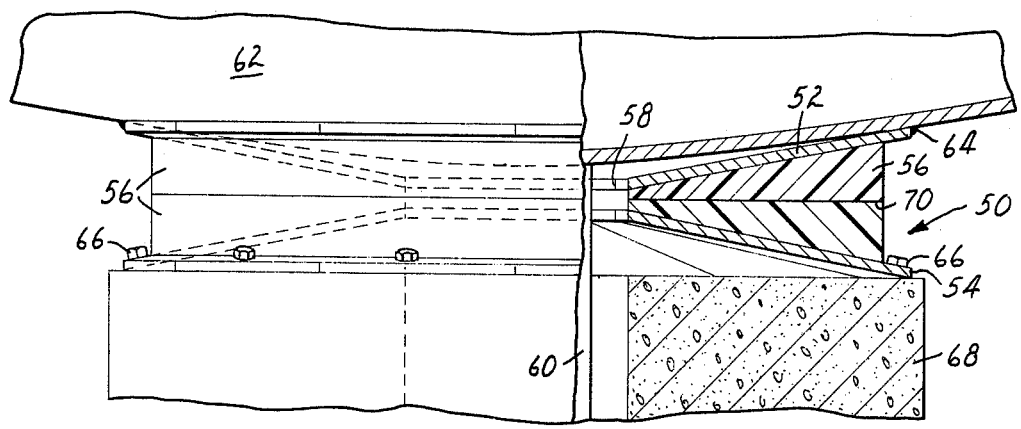
FIG. 4 is a fragmentary elevation, broken in part to a central section, showing another damping unit of the invention assembled to a globular storage tank.
Figure 5:
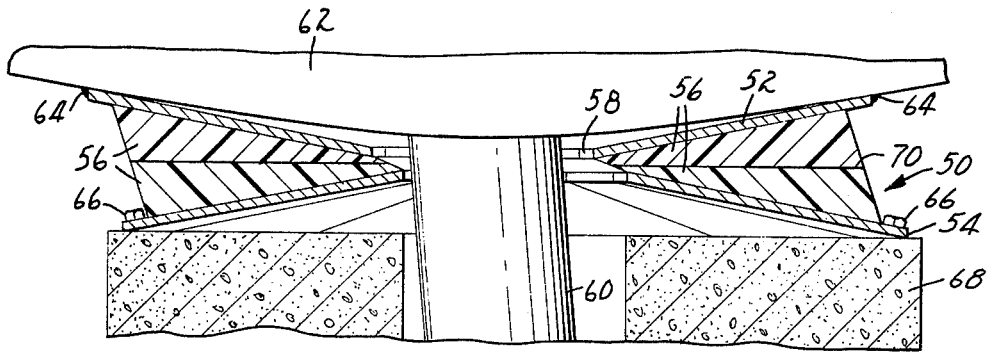
FIG. 5 is a fragmentary section of the damping unit and tank of FIG. 4 showing the effect of lateral movement of the tank.
Figure 6:
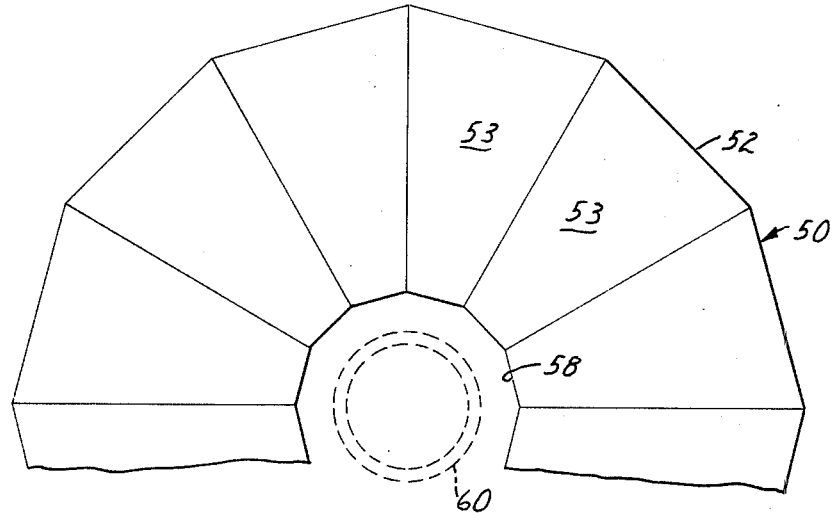
FIG. 6 is a partial plan view of the damping unit of FIGS. 4 and 5.

The damping unit 50 of FIGS. 4–6 has an upper rigid member 52 and a lower rigid member 54, each of which is made by welding together a number of cuneiform plates. As seen in FIG. 6, the upper rigid member 52 comprises twelve cuneiform plates 53, which together provide an essentially frusto-conical surface. Bonded to the essentially frusto-conical surfaces of the rigid members 52 and 54 is a viscoelastic layer 56 of wedge-shaped radial cross-section (the wedge shape of which is exaggerated for purposes of illustration). A central opening 58 is provided in the damping unit 50 to accommodate an inlet and/or outlet 60 for the storage tank 62. The upper rigid member 52 is welded at its periphery 64 to the shell of the storage tank 62, and the lower rigid member 54 is bolted at its periphery 66 to a concrete footing 61. As seen in FIG. 5, lateral and downward movement of the storage tank 62 causes shear displacement in the viscoelastic layer 56.

As described in Example 2 below, the viscoelastic layer 56, because of its wedge shape, is preferably made in two parts adhered together by an adhesive at a surface 70.

EXAMPLE 1

To construct the damping unit 14 illustrated in FIGS. 1–3, the lower rigid member 20 and the flat plate and gussets of the upper rigid member 16 may be cold rolled steel of about 1.25-cm thickness and the inner and outer diameters may be 60 cm and 130 cm, respectively. After vapor degreasing and phosphatizing the lower rigid member 16, a mold is created using a wax to seal a pair of articulated metal cylinders to the upper surface of the lower rigid member at its inner and outer diameters. The surfaces of the metal cylinders which face each other are first coated with a mold release. The top of the mold is closed by a quartz glass cover.

While circulating refrigerated nitrogen gas through the mold, a polymerizable mixture of by weight 100 parts of iso-octyl acrylate, 25 parts of acrylic acid and 0.31 part benzoin ethyl ether is introduced through a plurality of ports in the outer metal cylinder to cover the surface of the lower rigid member 16 to a depth of about 6 mm. A bank of ultraviolet lights (F40BL fluorescent) positioned immediately above the quartz glass cause the mixture to become fully polymerized within about 5 minutes, at which point additional mixture is added. This process is continued until attaining a polymerized viscoelastic layer 32 of approximately 10 cm in thickness while retaining the temperature at about 25° C or less. Higher temperatures may cause bubbling.

After removing the class cover and metal cylinders, the upper rigid member 16 is bonded to the surface of the viscoelastic layer 32 using an epoxy adhesive such as a composition consisting essentially of equal parts by weight of a bisphenol-epichlorohydrin epoxy resin having an epoxy equivalent of about 185–190 and polyamide resin addition product of polymerized long chain fatty acid and polyfunctional amine (specifically "Versamid" 125 which has an amine value of 290–320 and a viscosity at 40° C of 80–120 poises). The adhesive composition also contains 15 parts of thixotropic agent per 100 parts of epoxy plus polyamide resin.

Although unnecessary for performance, it is preferred to protect the soft cylindrical surfaces of the viscoelastic material, e.g., by covering them with plastic-backed pressure-sensitive adhesive tape.

The viscoelastic material of this Example has approximately the following properties at 23° C and a frequency of 5 cycles/second:

| | |
|---|---|
| Dynamic elastic shear modulus (G') | $7.0 \times 10^7$ dynes/cm$^2$ |
| Dynamic loss shear modulus (G'') | $8.2 \times 10^7$ dynes/cm$^2$ |
| Loss tangent | 1.2 |

It has a shear strain value at 23° C and a frequency of 5 cycles/second considerably in excess of one. Because this viscoelastic material when protected from the elements essentially undergoes no change over periods of years at ordinary room temperature, the damping unit of this Example requires essentially no maintenance in use unless subjected to destructive forces.

EXAMPLE 2

Because of the wedge-shaped radial cross-section of the viscoelastic layer 56 of FIGS. 4–6, it is preferably made in two parts. Each part is made using the respective rigid member (52 or 54) as the base of the mold and polymerizing the viscoelastic material a layer at a time as in Example 1. Upon completing both parts, they are adhered together with an epoxy adhesive such as that described in Example 1.

I claim:

1. Damping unit for a bulk storage tank which rests on a peripheral framework, said damping unit comprising at least two rigid members having essentially annular broad surfaces, one member adapted to be fixed to the nadir of the tank, the other member adapted to be anchored to the earth, and a layer of age-resistant viscoelastic material bonded to said broad surfaces and having a thickness of at least one centimeter,
an area of at least 1000 square centimeters,
a loss tangent of at least 0.5 at 23° C and a frequency of 5 cycles/second,
a shear strain value of at least one at 23° C and a frequency of 5 cycles/second, and
a bond to said broad surfaces that does not fail when the shear strain in the viscoelastic layer is one.

2. Damping unit as defined in claim 1 wherein the viscoelastic material has
an ultimate shear strength of at least 1.5 N/m$^2$ at 23° C and
an elongation in tension of at least 100% at 23° C.

3. Damping unit as defined in claim 2 having a central opening to accommodate an inlet and/or outlet for the tank.

4. Damping unit as defined in claim 3, one of said rigid members comprising a plate having a plurality of upstanding, radially extending gussets which reach maximum height at its periphery and are adapted to be fixed to a globular storage tank at their points of maximum height.

5. Damping unit as defined in claim 4 wherein said broad surface of each of said rigid members is flat and the viscoelastic layer has uniform thickness.

6. Damping unit as defined in claim 4 wherein said broad surfaces are essentially frustro-conical and the viscoelastic layer is thicker at its periphery than at its central opening.

7. Damping unit as defined in claim 1 wherein the viscoelastic layer has a uniform thickness of 5–25 cm and each of the rigid members has a stiffness at least equal to that of 0.5-cm steel plate.

8. A bulk storage tank which rests on a peripheral framework and is fitted with one or more damping units as defined in claim 1 attached to the nadir of the tank, one rigid member of each damping unit being fixed to the tank and the other rigid member being anchored to the earth with its viscoelastic layer extending horizontally so that lateral movement of the tank tends to be damped by the viscoelastic material.

* * * * *